United States Patent [19]

Furcsik

[11] Patent Number: 5,147,665

[45] Date of Patent: Sep. 15, 1992

[54] PROCESS FOR IMPROVING THE SHELF LIFE OF BAKED GOODS

[75] Inventor: Susan Furcsik, Lake Station, Ind.

[73] Assignee: American Maize-Products Company, Stamford, Conn.

[21] Appl. No.: 676,870

[22] Filed: Mar. 28, 1991

[51] Int. Cl.$^5$ .................. A21D 8/02; A21D 13/06; A23L 1/0522

[52] U.S. Cl. ........................ 426/19; 426/243; 426/551; 426/556; 426/578; 426/589

[58] Field of Search ............ 426/556, 589, 578, 549, 426/243, 19, 551

[56] References Cited

U.S. PATENT DOCUMENTS

| | | | |
|---|---|---|---|
| 4,154,863 | 5/1979 | Kahn et al. | 426/553 |
| 4,615,888 | 10/1986 | Zallie et al. | 426/556 |
| 4,789,557 | 12/1988 | Friedman et al. | 426/589 |
| 4,973,447 | 11/1990 | Seib et al. | 426/556 |

OTHER PUBLICATIONS

Roy L. Whistler; James N. BeMiller; Eugene F. Paschall, Starch: Chemistry and Technology, 1984, Academic Press, Inc. pp. 70–71.

Sultan "Practical Baking" Revised Third Edition, Chapter 9, Chemical Leavening Agents—pp. 44–48.

*Primary Examiner*—Jeanette Hunter
*Assistant Examiner*—Mary S. Mims

[57] ABSTRACT

The shelf life of a baked good is improved by adding a duwx starch to a baked good in an amount of 0.5 to 20 parts by weight of base flour component. It can be used with both yeast and chemical leavening agents.

19 Claims, No Drawings

PROCESS FOR IMPROVING THE SHELF LIFE OF BAKED GOODS

This invention relates to baked goods and, more particularly, to a process for improving the shelf life of a baked good. The process entails incorporating dull waxy (duwx) starch into the batter prior to cooking.

Baked goods such as muffins, cakes, pie crusts, doughnuts and the like are conventionally made from a batter comprising a base flour component, water and a leavening agent. The base flour component is usually wheat flour. However, whole grains and fractions of whole grains, such as corn meal, wheat bran, oatmeal are often used in combination with or as the sole base flour component in a baked good. The leavening agent is usually a yeast or a chemical leavening agent, such as sodium bicarbonate and acid-reacting materials.

All baked goods go through a change which makes them organoleptically unacceptable to consumers. This change is generally referred to as staling and is recognized as different from the action of microorganisms on the baked goods which cause spoilage. Stale baked goods, typically, are less moist and less resilient than fresh baked goods. The staling of baked goods is especially a problem for baked goods which are made in a microwave oven. Typically, a baked good made from a batter and cooked in a microwave oven is found to have an extremely short shelf life.

Preservatives and humectants are conventionally employed to retard staling and improve shelf life. Typically, lecithin, mono- and diglycerides and esters thereof, stearyl tartate, sodium and calcium stearoyl-2-lactylate and sodium lactate are used to prolong shelf life.

It has now been discovered that the use of a duwx starch in a baked good increases the shelf life and retards staling of the baked good. The use of duwx starch in foods is known, see U.S. Pat. No. 4,789,557 issued Dec. 6, 1988. However, such use was for replacement of chemically modified starches, not as a preservative or a humectant. Additionally, it has also been discovered that duwx starch improves the shelf life of baked goods made in a microwave oven as well as in a conventional cooking process such as a hot air oven or a deep fat frier.

In order to improve the shelf life of a baked good in accordance with the present invention, duwx starch is added to the batter prior to cooking the baked product. The amount of duwx starch added to the batter is an effective amount to improve shelf life and resilience of the baked good. Preferably, about 0.5 to about 20 parts by weight based on 100 parts by weight base flour component (phf) of a duwx starch is added to the batter. More preferably, about 1 to about 15 phf of duwx starch is added to the batter. More preferred, about 2 to about 10 phf of duwx starch is added to the batter. These percentages or phfs are typically referred to as baker's percents. In yeast-leavened baked goods, less duwx starch is needed than in chemically leavened baked goods.

To improve shelf life and retard staling, duwx starch can be employed as the only preservative/humectant or it can be used in conjunction with other known agents for improving shelf life and retarding staling.

The duwx starch employed in this invention is obtained from a starch bearing plant which is dull waxy (duwx) homozygous genotype. The term duwx starch means not only starch obtained from a starch bearing plant that has a duwx homozygous genotype duduwxwx but also translocations, inversions and other variants that contain the duwx genotype.

Any plant source which produces edible starch and which can be crossbred to produce a plant having a duwx homozygous genotype may be used. It has been found that waxy maize, waxy rice, waxy barley and waxy sorghum have the mutant waxy (wx) gene while the dull (du) gene is obtained from cereal grains such as maize, rice, barley and sorghum. Maize is the preferred plant source. The waxy gene is reported to be located on chromosome 9 of the maize chromosomes. See "Development Genetics," Volume 5, pages 1-24, 1984. The dull gene is reported to be located on chromosome 10 of the maize chromosomes.

Generally, to obtain a starch bearing plant with both double recessive mutants of the du and wx genotype, a plant of a wx mutant is crossed with a plant having a du mutant and thereafter inbred to obtain a plant homozygous in duwx. After the homozygous duwx genotype is obtained, standard breeding techniques are used to obtain hybrid vigor. Hybrids are preferred because of their high starch yield compared to inbred lines. As is well-known to those in the art of corn processing, seed corn is different than the corn used to harvest for food. The method of crossbreeding plants and of obtaining specific genotypes in the offspring as well as breeding to obtain hybrid vigor is conventional.

Extraction of duwx starch from the plant is well known and typically entails a milling process, either dry or wet. Milling techniques to extract the starch from the plant are conventional.

Preferably, the duwx starch is used either in the granular form or in the pregelatinized form. Pregelatinizing of starch is conventional and well known to those of skill in the art. One method for pregelatinizing starch granules entails passing the starch granules through the nip of two opposing rollers while maintaining the rollers at about 380° F. (190° C.). This process is conventionally termed 'hot rolling'. Pregelatinizing of the granular duwx starch partially gelatinizes the starch. The duwx starch may also be used in a ground form such as grits, hominy, meal and flour. Preferably, duwx starch is used either in a pregelatinized form or in a granular form.

The leavening agent is either a yeast or a chemical leavening agent. The leavening agents aerate the batter to make the resulting baked good light and porous. This is generally accomplished by release of a gas, carbon dioxide. Suitable chemical leavening agents include baking powder, baking soda (sodium bicarbonate) and ammonium bicarbonate. Baking powder typically is made of sodium bicarbonate and an acid-reacting material such as tartaric acid or its salts, acid salts of phosphoric acid, components of aluminum, and combinations thereof.

The base flour component is suitably wheat flour, corn meal, whole grains and fractions of whole grains such as wheat bran and oatmeal or mixtures thereof; however, any starch(es) or farinaceous material(s) can be employed. The preferred base flour component is wheat flour.

A batter made in accordance with the present invention comprises about 100 parts by weight of a base flour component; about 50 to about 200 phf of water; an effective amount of duwx starch; and about 0.1 to about 5 phf of a leavening agent. Other conventional additives well-known to those of skill in the art can be added to the batter such as sugar, salt, shortening, eggs, milk, vegetable oil, food coloring and food flavoring.

In order to make a baked product in accordance with the present invention, a batter is prepared from a base flour component, water, leavening agent and duwx starch; the batter is then cooked in a conventional manner. The batter is prepared in a conventional manner using conventional equipment. Cooking is accomplished in any suitable manner such as a deep fat frier, an oven which is either microwave, hot air (either conventional or convection), or combinations thereof.

It will be recognized by those of skill in the art that the batter can be made and then frozen for cooking at a later time; or that the dry components, to include duwx starch, can be made up and stored for the addition of the liquid ingredients and cooked at some later date. These premixes and frozen doughs are fairly popular among consumers.

The term batter has been used throughout the specification and claims to refer to the mixture of flour, water, and leavening agent. The term batter is often used to refer to a mix of flour and water which is thinner in consistency than dough; however, the term batter as used in the specification and claims means both dough and batter as these terms are conventionally used as well as any aqueous starch slurry containing a leavening agent which is cooked to form a food product.

These and other aspects of the present invention may be more readily understood by reference to the following examples.

EXAMPLE 1

This example illustrates making bran and raisin muffins using a combination of bran flakes and all-purpose flour (wheat) as the base flour component, and sodium bicarbonate, monocalcium phosphate and sodium aluminum phosphate as the leavening agent. A granular form of duwx starch was employed.

The muffins were baked in a microwave and found to have good flavor, moisture and volume after 72 hours of standing at room temperature (about 20° C.).

The following ingredients and procedure were used to make the muffins:

TABLE I

| Bran and Raisin Muffin Mix | | |
|---|---|---|
| Ingredients | grams | percent |
| Vegetable Shortening (Crisco) | 21.3 | 6.09 |
| Propylene Glycol Mono Esters (P.G.M.E.), EC-25 (Van Den Bergh Foods) | 4.1 | 1.17 |
| Dark Brown Sugar | 108.4 | 31.02 |
| Bran Flakes | 72.5 | 20.75 |
| All-purpose Flour | 72.5 | 20.75 |
| Salt, fine granulated | 3.15 | 0.90 |
| Sodium Bicarbonate | 3.45 | 0.99 |
| Monocalcium Phosphate Regent 12xx | 2.45 | 0.70 |
| Sodium Aluminum Phosphate, BL-60 | 0.45 | 0.13 |
| duwx Starch | 10.90 | 3.12 |
| Dextrose | 4.0 | 1.14 |
| Xantham Gum | 1.25 | 0.36 |
| Raisins (seedless) | 45.0 | 12.88 |
| Total | 349.45 | 100.00 |
| Water | 155.0 | |
| Whole Eggs, fresh | 50.0 | |
| Corn Oil | 46.0 | |
| Cinnamon Streusel Topping | | |

TABLE I-continued

| Bran and Raisin Muffin Mix | | |
|---|---|---|
| Ingredients | grams | percent |
| Brown Sugar | 30.0 | 24.49 |
| Vegetable Shortening (Crisco) | 30.0 | 24.49 |
| Ground Cinnamon | 2.5 | 2.04 |
| All-purpose Flour | 60.0 | 48.98 |
| Total | 122.5 | 100.00 |

A conventional procedure was used to make the muffins. The bran and raisin muffin mix was prepared by melting the shortening and PGME and then combining them with brown sugar and the other dry ingredients. To this mixture, egg and oil was added and further mixed.

The cinnamon streusel topping was prepared by first melting the shortening and then mixing the melted shortening with the other components.

The muffins were baked in a circular microwave muffin pan in a microwave oven at 700 watts for 2½ minutes. The streusel topping was placed on top of the batter prior to baking.

Initially, the muffins were found to have good moisture and volume. After 24 hours of sitting uncovered at room temperature, they were still found to have good moisture. After 72 hours, the muffins were found to have good moisture, good volume and good flavor.

EXAMPLE 2

This example illustrates making oat, apple and walnut muffins using a combination of quick oats and all-purpose flour (wheat) as the base flour component. A granular form of duwx starch is employed in this example.

The muffin dough ingredients were as follows:

TABLE II

| Oat, Apple and Walnut Muffin Mix | | |
|---|---|---|
| Ingredients | grams | percent |
| Vegetable Shortening (Crisco) | 21.3 | 5.36 |
| Propylene Glycol Mono Esters (P.G.M.E.), EC-25 (Van Den Bergh Foods) | 4.1 | 1.03 |
| Dark Brown Sugar | 108.4 | 27.27 |
| Quick Oats | 72.5 | 18.24 |
| All-purpose Flour | 72.5 | 18.24 |
| Salt, fine granulated | 3.15 | 0.79 |
| Sodium Bicarbonate | 3.45 | 0.87 |
| Monocalcium Phosphate, Regent 12xx | 2.45 | 0.62 |
| Sodium Aluminum Phosphate BL-60 | 0.45 | 0.11 |
| duwx Starch | 10.90 | 2.74 |
| Dextrose | 4.0 | 1.01 |
| Xantham Gum | 1.25 | 0.31 |
| Apples, evaporated, diced, ¼-inch | 30.0 | 7.55 |
| Walnuts, chopped, ¼-inch | 63.0 | 15.85 |
| Total | 397.45 | 100.00 |
| Water | 155.0 | |
| Whole Eggs, fresh | 50.0 | |
| Corn Oil | 46.0 | |

The muffins were prepared in accordance with Example 1 above and the same streusel topping as used in Example 1 was sprinkled on top of the muffin batter prior to cooking. The baking procedure employed in Example 1 was used to bake the muffins.

The muffins prepared in this example were found to have as good a resistance to staling as the muffins prepared in Example 1 above.

EXAMPLE 3

This example illustrates making a series of bran muffins so as to compare bran muffins without any duwx starch and bran muffins with either a duwx starch in granular form or a duwx starch in pregelatinized form. The following base bran muffin batter was used in all cases:

TABLE III

| Base Bran Muffin Batter (based on flour as 100%) | |
|---|---|
| Ingredients | Percent |
| All-purpose Flour | 100.0 |
| Water (adjusted for tests - see Table IV) | 100.5 |
| Sugar, dark brown, packed | 65.4 |
| Whole Eggs, fresh | 46.7 |
| Honey, liquid | 28.0 |
| Wheat Bran | 23.3 |
| Corn Oil | 19.85 |
| Margarine | 19.85 |
| Molasses, liquid | 18.7 |
| Non-fat Dry Milk | 6.6 |
| Baking Powder | 4.7 |
| Salt | 2.5 |
| Vanilla | 2.3 |
| Cinnamon | 0.35 |
| Carboxymethyl Cellulose | 0.35 |
| Total | 439.10 |

A half-dozen muffins per sample identification in Table IV below were made using the batter from Table III above. Additionally, some extra water was added to each of the muffin mixes along with the duwx starch component. The amount of extra water is shown in Table IV:

TABLE IV

| Conditions for Testing Starches in Base Bran Muffin Batter | | |
|---|---|---|
| | Amounts Used (percent, based on flour) | |
| Sample Identification | duwx Starch | Extra Water |
| C (Control) | 0 | 0 |
| 1 duwx starch (granular) | 2 | 2 |
| 2 duwx starch (granular) | 5 | 7 |
| 3 duwx starch (granular) | 9 | 11 |
| 4 duwx starch (granular) | 12 | 18 |
| 5 duwx starch (pregelatinized) | 2 | 2 |
| 6 duwx starch (pregelatinized) | 5 | 7 |
| 7 duwx starch (pregelatinized) | 9 | 41 |
| 8 duwx starch (pregelatinized) | 12 | 45.4 |

The procedure used to make the muffins was the same in each case. The sugar, honey, corn oil, margarine, molasses and salt were creamed together. Then the eggs and vanilla were mixed in to form a moist blend. A dry blend of flour, wheat bran, non-fat dry milk, baking powder, cinnamon, carboxymethyl cellulose and duwx starch as listed in Table IV above was formed. Then the dry blend and moist blend were mixed with the water to form the batter. Using a standard muffin pan, 70 grams of batter were placed in each muffin cup and the pan baked in a conventional oven at 415° F. (210° C.) for 17 minutes. Samples 3, 4, 7 and 8 were baked for 18 minutes.

One muffin from each sample was placed in a group for a total of six groups and the groups were evaluated by a panel for taste and appearance. The first group containing one muffin from each sample was evaluated immediately after baking. Muffins from samples 5 and 6 were rated as outstanding in appearance, moisture and eating quality. The control muffin (sample C) was found to be good but dry. Likewise, samples 1-4 were found to be good but dry.

The second group of muffins containing one muffin from each sample was stored at room temperature for 7 days. The control muffin (sample C) and sample 1 were found to be very dry. The remaining muffin samples 2-8 were found to be dry.

The third group of muffins containing one muffin from each sample was intended to be evaluated after two weeks storage at room temperature; however, they were found to have mold growing on top after the first week of storage at room temperature.

The fourth, fifth and sixth groups of muffins were frozen. The fourth group was evaluated one week after being frozen, the fifth group two weeks after being frozen, and the sixth group three weeks after being frozen. Each group was defrosted by heating in a microwave for 30 seconds at 100% power (700 watts) and then allowed to stand at room temperature for about 20 minutes. In each group, the control was found to be dry while the muffins made in accordance with the present invention were found to be more moist than the control and to have a better appearance than the control.

EXAMPLE 4

The following example teaches making a doughnut in accordance with the present invention using yeast as a leavening agent.

TABLE V

| Base Batter | |
|---|---|
| Ingredients | phf |
| Bread flour | 80 |
| Pastry flour | 20 |
| duwx starch (pregelatinized) | 5 |
| Sugar | 10 |
| Non-fat milk solids | 4 |
| Salt | 2 |
| Shortening (Crisco) | 10 |
| Water, 40° F. | 50 |
| Eggs, whole | 10 |
| Yeast, compressed | 8 |

The doughnuts are made in a conventional manner using conventional equipment. All ingredients are mixed and when the batter becomes cohesive and extensible (5 to 10 minutes), the batter is placed in 80° F. (27° C.) atmosphere for about one hour to allow the batter to rise. Doughnuts are then shaped out of the batter and fried in hot fat at 365°-380° F. (185°-193° C.) until golden brown on one side. The doughnuts are then flipped and fried on the other side. Then the fried doughnuts are drained and allowed to cool.

EXAMPLE 5

This example illustrates making yellow and white layer cakes which, after baking, were frozen for over two weeks, then thawed and evaluated. This example evidences that the method of the present invention results in improved shelf life for baked goods even though the goods were frozen for an extended period of time.

The following base batter was prepared:

TABLE VI

|  | White (phf) | Yellow (phf) |
|---|---|---|
| Cake Flour (wheat) | 66.67 | 66.67 |
| Bread Flour (wheat) | 33.33 | 33.33 |
| Sugar, granular | 116.67 | 115.39 |
| Liquid Egg Whites | 70.83 | — |
| Liquid Whole Eggs | — | 63.46 |
| Liquid Whole Milk | 75.00 | 46.15 |
| Shortening | 45.83 | 53.85 |
| Baking Powder | 5.83 | 2.69 |
| Salt | 2.08 | 0.77 |
| Liquid Vanilla | 0.42 | 1.54 |
| Liquid Lemon Oil | — | 0.77 |

From these two base batters four cakes were prepared, one from each of the base batters to act as controls, and one from each of the base batters to which 5 phf of duwx starch and 5 phf water was added to make two baked goods, one yellow cake and one white cake, in accordance with the present invention. The duwx starch employed in this example was pregelatinized by hot rolling.

Both the yellow and the white cakes were baked in a conventional oven at 365° F. (188° C.) for about 40 minutes, or until done.

After being frozen for about a two-week period, all cakes were thawed by allowing them to stand at room temperature for 8 hours. Then the cakes were allowed to stand at room temperature for 96 hours. After 96 hours, the cakes made without the addition of duwx starch were starting to show signs of being stale while the two cakes with the added duwx starch were still fresh and soft with good mouth feel.

EXAMPLE 6

This example illustrates making frozen muffin batters, storing them in a freezer and then using the muffin batters to prepare muffins.

The following base muffin batters were prepared:

TABLE VII

|  | Plain (grams) | Honey Bran (grams) |
|---|---|---|
| All Purpose Flour (wheat) | 525 | 375 |
| Wheat Bran | — | 202.5 |
| Shortening | 105 | 60 |
| Whole Eggs | 90 | 60 |
| Whole Milk | 649.5 | 630 |
| Baking Powder | 25.5 | 27.0 |
| Salt | 15.0 | 10.5 |
| Sugar | 90.0 | — |
| Honey | — | 135 |

From these two base batters four sets of muffins were prepared, one from each of the base batters to act as controls, one from each of the base batters along with the addition of 5 phf of duwx starch and 7 phf added water. The duwx starch used in this example was pregelatinized in a hot roll.

All the prepared batters were frozen for a period of time and then thawed overnight in a refrigerator so as to make the batter easy to handle. Using a standard muffin tin, the cold batter was placed in the tin and baked at 400° F. (204° C.) for about 35 minutes.

After baking, the muffins were stored at room temperature for 72 hours and evaluated. The muffins made in accordance with the present invention were soft and fresh, while the control muffins were rough and bordering on stale.

EXAMPLE 7

This example illustrates using the present invention in a dry yellow cake premix which is baked in a microwave oven.

The following base, dry premix was prepared:

TABLE VIII

|  | phf |
|---|---|
| All Purpose Flour (wheat) | 100.00 |
| Vegetable Shortening | 22.03 |
| Polyglycol mono ester | 4.24 |
| Sugar, fine granular | 112.11 |
| Salt, fine granular | 3.26 |
| Monocalcium phosphate | 3.56 |
| Sodium Bicarbonate | 2.53 |
| Sodium Aluminum Phosphate | 0.46 |
| Dextrose | 4.13 |
| Butter-Vanilla Flavoring | 5.98 |
| Xanthan Gum | 0.96 |
| Yellow #5, 5.% on Dextrose | 0.13 |
| duwx Starch, granular | 8.45 |

In order to make the dry mix into batters, 29.84 phf of water; 13.15 phf of whole fresh eggs; and 12.36 phf of oil were added to each of the mixes.

To bake the cake, once the batter was made, it was poured into a square cake pan and cooked at 700 watts for about 4½ minutes. Once baked, the cake was removed from the microwave oven and allowed to cool. The cake was found to be comparable to other commercial, dry premix microwave cake mixes.

It will be understood that the claims are intended to cover all changes and modifications of the preferred embodiments of the invention herein chosen for the purpose of illustration which do not constitute a departure from the spirit and scope of the invention.

What is claimed is:

1. In a baked good prepared from a batter comprising base flour component, water and a leavening agent, the improvement comprising adding an effective amount of a duwx starch, the amount being effective to improve the shelf life and resilience of the baked good.

2. The baked good of claim 1 wherein the amount of duwx starch present in the batter is about 0.5 phf to about 20 phf.

3. The baked good of claim 1 wherein the duwx starch is obtained from maize.

4. The baked good of claim 1 wherein the duwx starch is present in granular form.

5. The baked good of claim 1 wherein the duwx starch is present in pregelatinized form.

6. The baked good of claim 1 wherein the leavening agent is a chemical leavening agent.

7. The baked good of claim 1 wherein the leavening agent is yeast.

8. The baked good of claim 1 wherein the base flour component is wheat flour.

9. A process for improving the shelf life of a baked good comprising:
    (a) forming a batter from a base starch component, water, a leavening agent and an effective amount of a duwx starch, the amount being effective to improve the shelf life of said baked good; and
    (b) baking the batter to produce said baked good.

10. The process of claim 9 wherein the duwx starch is obtained from maize.

11. The process of claim 9 wherein the amount of duwx starch added to said batter is about 0.5 phf to about 20 phf.

12. The process of claim 9 wherein the duwx starch is added in granular form.

13. The process of claim 9 wherein the duwx starch is added in pregelatinized form.

14. The process of claim 9 wherein the leavening agent is a chemical leavening agent.

15. The process of claim 9 wherein the leavening agent is yeast.

16. The process of claim 9 wherein the base flour component is wheat flour.

17. The process of claim 9 wherein baking is accomplished by a microwave oven.

18. The process of claim 9 wherein baking is accomplished by a convection oven.

19. The process of claim 9 wherein baking is accomplished by a conventional oven.

* * * * *

UNITED STATES PATENT AND TRADEMARK OFFICE
CERTIFICATE OF CORRECTION

PATENT NO. : 5,147,665

DATED : September 15, 1992

INVENTOR(S) : Susan L. Furcsik

It is certified that error appears in the above-identified patent and that said Letters Patent is hereby corrected as shown below:

Column 1, line 14, after "bran," insert --or--;
line 56, change "More" to --Most--;
line 67, change "which is" to --with a--.

Column 2, line 26, change "used to harvest" to --harvested--.

Column 8, line 1, change "rough" to --tough--;
line 62, change "starch" to --flour--.

Signed and Sealed this

Twenty-sixth Day of October, 1993

BRUCE LEHMAN

Attest:

Attesting Officer

Commissioner of Patents and Trademarks